Aug. 14, 1962          C. B. OLIVER          3,049,142
DOSING MEANS
Filed Oct. 20, 1954          2 Sheets-Sheet 1
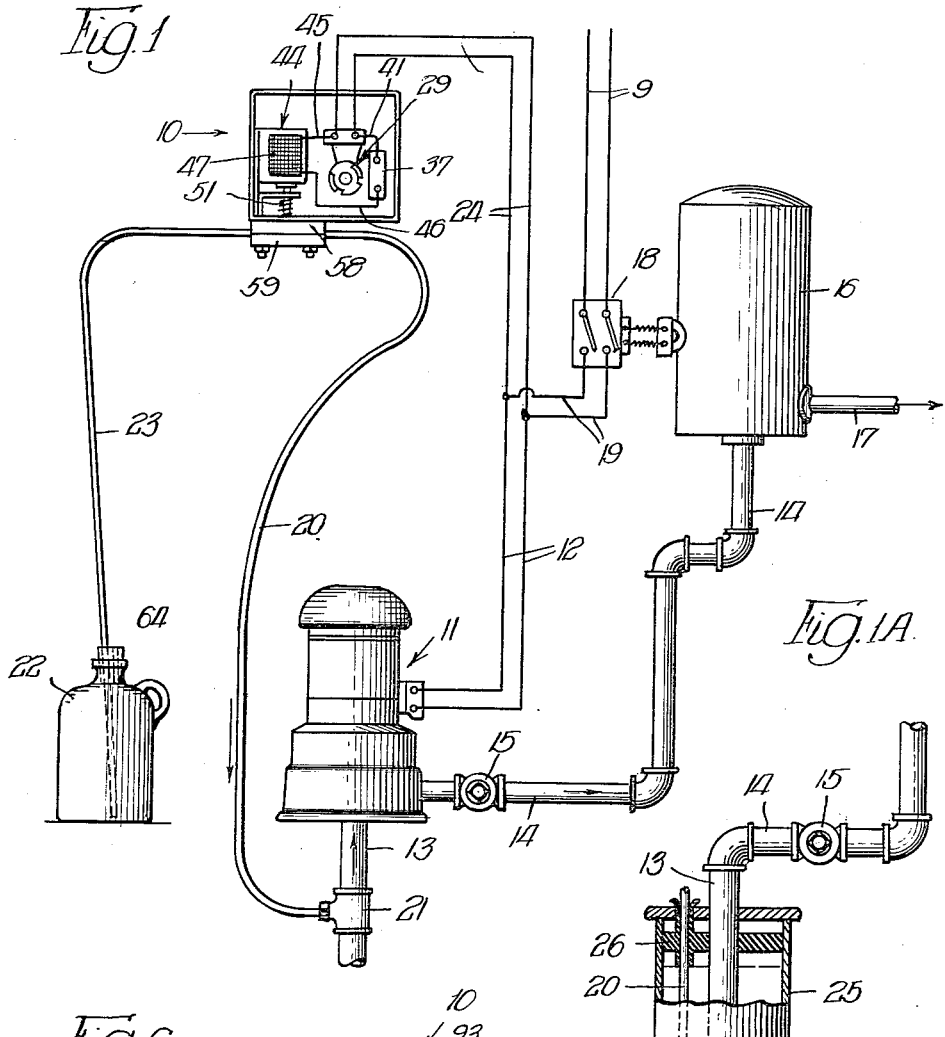
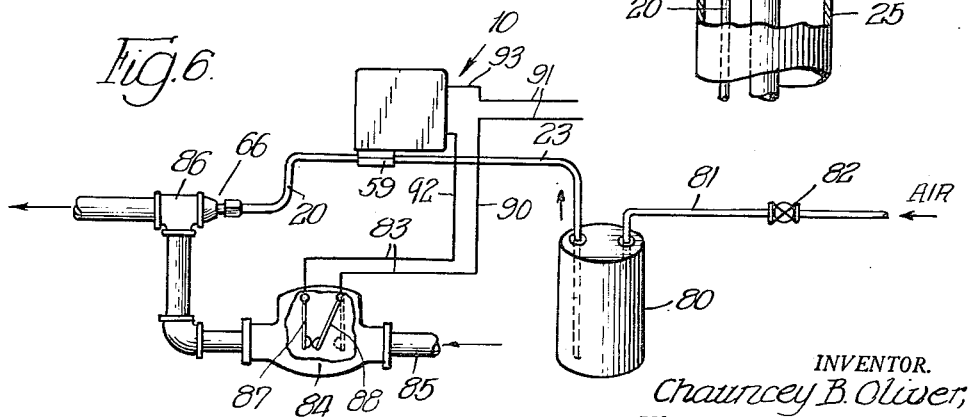
INVENTOR.
Chauncey B. Oliver,
BY
Cromwell, Greist & Warden
ATTYS

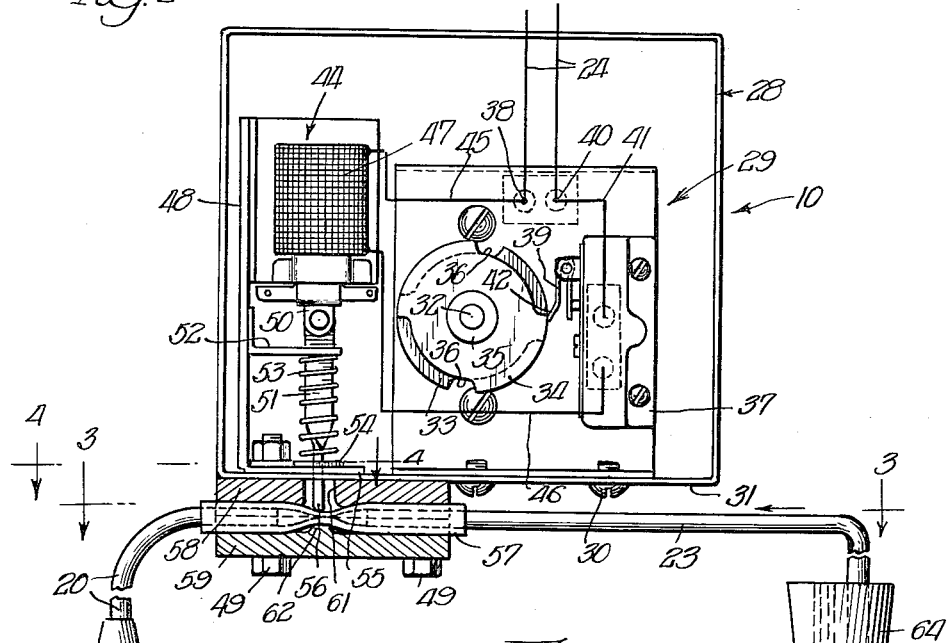
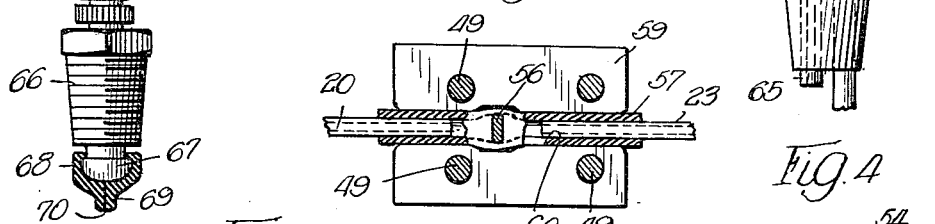
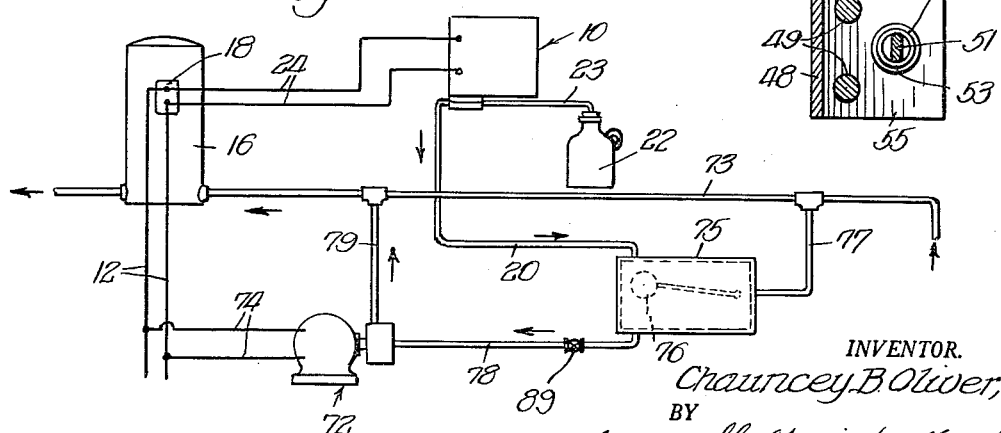

United States Patent Office 3,049,142
Patented Aug. 14, 1962

3,049,142
DOSING MEANS
Chauncey B. Oliver, Blue Diamond, Nev., assignor to Everpure, Inc., a corporation of Nevada
Filed Oct. 20, 1954, Ser. No. 463,427
7 Claims. (Cl. 137—114)

This invention relates broadly to means for accurately dosing into one body of liquid (e.g. water), which may be either stationary or flowing, with a small amount of a treating liquid (e.g. chlorinating solution). More particularly, the invention relates to both a novel system for automatically dosing a liquid with a very small quantity of treating liquid, and also to a novel electrically-actuated dosage control unit which automatically controls the periodic flow of the treating liquid for a relatively short time in response to the flow for a much longer time of the liquid to be dosed.

The invention is especially useful for dosing private domestic water supply systems with chlorinating solution. However, it will be understood that the invention is not limited to this or any particular use but has wide application.

While there are many instances in which there is a need to dose one liquid with a small amount of a treating liquid, one of the largest and most common needs for such dosing is in the treatment of water with chlorinating solutions or sequestering agents. Satisfactory chlorinating equipment, referred to as automatic hypochlorinators, is available on the market for treating water systems, such as small municipal water systems and swimming pools, which are not large enough to justify the expensive installations which dose water with chlorine itself, which is the cheapest chlorinating agent but dangerous unless properly handled. These automatic hypochlorinators use dilute solutions, e.g. sodium hypochlorite, and are not normally subject to close supervision and should remain in operating condition without skilled or constant attendance. However, the automatic hypochlorinators which are reasonably satisfactory for these intermediate sized water systems, and which depend upon metering orifices, venturis or diaphragm pumps, are basically unsound and unsuited for small water systems such, for example, as the water supply system of a private residence supplied from its own well.

A brief consideration of typical specific quantities of chlorinating solution involved in dosing drinking water, for example, will serve to bring out the practical difficulties which account for this unsuitability. Health authorities consider that a chlorine concentration in the order of from one-tenth to two-tenths part per million residual will normally afford adequate water protection. A 5% sodium hypochlorite solution provides a satisfactory source of chlorine for treating small water supply systems. To dose water with such a sodium hypochlorite solution at the rate of two-tenths part per million of chlorine requires less than one drop of the solution for each five gallons of water treated. Thus, less than ten drops of 5% hypochlorite solution will be sufficient to dose the ordinary 50 gallon pressure storage tank of a private water system which may take a minute or so to fill. The flow rates of chlorinating solutions are sufficiently large in the case of the automatic chlorinators used for intermediate sized water systems so that these chlorinators have fairly large metering orifices or venturis and undue difficulties are not encountered with respect to clogging or regulating flow of dosing liquids. Normally, the automatic chlorinators for such intermediate systems are continuously operated. However, when it is attempted to reduce the same types of dosing apparatus to the small fractional scale which would be required for dosing much smaller water supply systems requiring only a few drops of treating solution per minute, such as those of individual homes, such dosing apparatus designs prove to be impractical. Thus, the metering orifices and venturis become so tiny that they are easily clogged in operation. Furthermore, it is extremely difficult to maintain accurate adjustment under such very small dosing requirements.

Greatly diluting the treating solutions so as to increase the flow rates to the point where they can be handled by known automatic hypochlorinators is not a satisfactory answer to the problem of chlorinating the smaller water systems for several reasons. The water used for diluting usually has at least some hardness and increases the tendency for the metering orifices to become clogged. Diluting the commercial concentrations of the treating solutions constitutes an extra step and is a likely source of error. Furthermore, diluting the treating liquid makes it necessary to greatly increase the size of the supply container for holding the treating liquid.

The dosing means of the present invention operates on a different principle from known automatic chlorinators or other dosing apparatus and does not involve metering orifices, venturis or diaphragm pumps. A further fundamental difference resides in the fact that the dosing means of the present invention incorporates timing means so that the undiluted dosing or treating liquid is introduced at a full flow rate but for only a part of the time that the quantity of water being dosed is flowing. If the undiluted dosing liquid were to flow continuously as in the prior art apparatus, tiny orifices would be required.

An object of the invention is a reliable, easily installed, inexpensive dosing system which is free of metering orifices, venturis and delicate moving parts and which, without attention or adjustment, will accurately dose a liquid with a very small amount of treating liquid in response to flow of the liquid to be dosed.

Another object of the invention is a dosing system for introducing a very small or minute dose of treating liquid into a relatively large volume of liquid to be treated wherein a timing motor is driven throughout the duration of flow of the liquid to be treated and serves to periodically open for a short predetermined interval a rapid or snap-acting valve in a treating liquid line and permit periodic doses of treating liquid to pass.

Another object of the invention is a reliable, inexpensive, easily-installed dosing system especially suited for small water systems of the type used in rural and suburban homes and farm buildings which use an electric pump to supply the system from a well, pond or other source, and wherein the dosing system has a timing motor which operates when the pump is running and which serves to actuate means for periodically fully opening a treating liquid line so as to periodically release accurately measured doses of treating liquid into the water system.

Another object of the invention is the provision of a rugged, reliable, inexpensive dosage control unit which, under control of its own timing motor, operates with a quick or snap-action to alternately fully release and completely pinch off a length of flexible conduit in a dosage liquid line.

Another object of the invention is an inexpensive and reliable dosing system for dosing a liquid system at a pressurized point wherein doses of treating liquid are periodically discharged, as required, by gravity into a tank provided with a float valve and from which tank heavily dosed liquid is withdrawn by a pump and forced under pressure into the liquid system.

Another object of the invention is a pinch or clamp valve of novel construction which is especially suited for use in the dosing apparatus of the present invention but which has other uses.

Certain other objects of the invention will, in part, be obvious and will, in part, appear hereinafter.

For a more complete understanding of the nature and scope of the invention, reference may now be had to the following description thereof taken in conjunction with the accompanying drawings, wherein:

FIG. 1 is a schematic view of a water supply system of the type widely used for private domestic water systems incorporating the dosing apparatus of the present invention;

FIG. 1A is a fragmentary view on enlarged scale illustrating a modified dosing arrangement wherein a submersible or cylinder well pump is used in place of a surface pump, the apparatus and system being otherwise as illustrated in FIG. 1;

FIG. 2 is a view on enlarged scale of the dosing apparatus shown in FIG. 1, including a front elevational view, partly in vertical section, showing the interior and working parts of a control unit constituting the heart of the dosing apparatus;

FIG. 3 is a fragmentary view in horizontal cross section along line 3—3 of FIG. 2, further illustrating the valve of the control unit shown in FIG. 2;

FIG. 4 is a detail view in horizontal section on line 4—4 of FIG. 2; and

FIGS. 5 and 6 are, respectively, fragmentary schematic views illustrating modified, pressure dosing adaptations of the invention involving, respectively, a booster pump and a pressurized dosing supply.

In FIG. 1 a dosage control unit of the present invention, designated generally at 10, is suitably installed to control the dosing of a common type of private water system. This water system includes an electric well pump 11 of known type, the suction intake of which is connected by a pipe 13 to a well, pond clear well or other water source. A discharge line 14 provided with a valve 15 leads from the discharge opening of the pump 11 to a pressure storage tank 16 wherein a cushion of air is compressed in its head space. Water is discharged from the tank 6 through an outlet line 17 to supply the demands of a water system. The operation of the pump 11 is controlled by a pressure-actuated switch 18 of known type suitably connected with an electric service line 9 providing, for example, 110 volt A.C. current. Switch 18 is connected by leads 19 to the supply leads 12 for the motor of pump 11. The control switch is pre-set so as to automatically close and energize the pump 11 when the pressure in tank 16 drops to, say, 20 pounds per square inch and to open when the pressure is increased to, say, 50 p.s.i.g.

Dosage control unit 10 is electrically connected by leads 24 in parallel circuit relation with the pump motor circuit, being thus energized electrically at the same time and for the same duration as pump 11. The details of the unit 10 and associated parts will be described below in connection with FIG. 2. The dosing system of FIG. 1, as shown associated therein with a surface pump 11, is equally applicable to an installation in which water is pumped by a submerged pump or a cylinder pump. An arrangement of the last mentioned sort is illustrated in FIG. 1A, in which corresponding parts are designated by corresponding numerals. Here the dosage tube 20 is brought into a well casing 25 through a well seal 26 and extends down to the suction side of a submerged pump or cylinder pump (not shown).

Referring now to FIGS. 2, 3 and 4, the unit 10 has a housing indicated generally at 28, to the bottom panel 31 of which the frame of a conventional electric clock motor 29 is secured by screws 30—30. It will be understood that the small synchronous motor 29 may be replaced by any other suitable timing motor.

A pair of notched timing disks 33, 34 are mounted on the drive shaft 32 of the motor 29, the rearmost disk 33, as viewed in FIG. 2, being rigidly secured on the shaft while the forward disk 34 is rotatively adjustable thereon. The outer disk 34 is carried on a hub 35 which fits over the outer end of the shaft 32 and which is secured in any desired position thereon by means of a set screw (not shown).

The disks 33, 34 may have the same size and shape and normally are angularly offset in relation to one another, thereby presenting diametrically opposed notches 36—36 where the outermost peripheries of the disks do not overlap. The angular or arcuate size of these notches 36 may be adjusted by turning disk 34 on shaft 32, and then clamping the same in the desired position. The angular width of the depressions 36 determines the duration of the valving cycle in the operation of unit 10.

A normally open control switch 37 of known commercial type is suitably mounted on the frame of the clock motor 29 with an actuating finger 39 being spring-pressed against the peripheries of the timing disks 33, 34. The switch 37 is in the open condition as long as the finger 39 rides on the periphery of either disk 33 or 34. When the end of the finger 39 drops into one of the notches 36 the switch is opened.

Leads or conductors 24 are connected to the two terminals 38 and 40 of the clock motor 29 so that it is energized and the shaft 32 rotates during the entire period that on-off switch 18 is closed and the pump 11 is running. One terminal of the coil 47 of a solenoid device 44 is connected by a conductor 45 to the adjacent terminal 38 of the clock motor 29 while the other terminal of the coil 47 is connected by a conductor 46 to one of the terminals of the switch 37 as shown. The other terminal of the switch 37 is connected by a conductor 41 to terminal 40 of the motor 29. Thus, the coil 47 is connected in parallel circuit relationship with the clock motor 29 and therefore energized only when the switch 37 is closed.

The solenoid device 44 is mounted on an appropriate rigid bracket 48 of L-shaped outline, which is secured to the housing 28 by two of a set of four bolt and nut fasteners 49 having a further function to be described.

The armature of the solenoid, the bottom projecting end of which is indicated at 50, has a plunger 51 secured thereon which is reciprocable in a vertical direction through a slot opening in a small sub-bracket 52 rigidly welded on the larger L-shaped bracket 48. A washer or disk 54 is fastened to the lower end of the plunger member 51. This washer fits over a slot in the horizontal foot 55 of bracket 48 and a registering slot in the bottom panel 31 of the housing 28. The bottom end of the plunger 51 projects externally of the housing 28.

A coil compression spring 53 fits over the plunger 51 and is maintained under compression between the bracket 52 at the top and the washer 54 at the bottom. The strength of the spring 53 is such as to hold the washer 54 down against the foot 55 except when the solenoid is energized. The solenoid has sufficient strength to overcome the force of the spring 53 so as to lift the plunger 51. The washer 54 is positioned on the plunger rod 51 so as to allow the rounded bottom end 56 of the plunger to pinch off and close a flexible valve member 57 without the valve member supporting the full force of the spring 53.

By means of the foregoing arrangement it is seen that spring 53, engaging washer 54 on plunger 51, will instantaneously drive the same outwardly (or downwardly, as illustrated in FIG. 2) with a snap action whenever solenoid coil 47 is de-energized. Washer 54 limits the spring-urged movement of the plunger 51 by engaging bracket foot 55.

The outer extremity of plunger 51 is shaped to provide a rounded nose pinch-off valve blade 56 which acts without injury on the valve member 57 in the form of a short length of flexible (e.g. rubber) tubing. The adjacent ends of a dosing liquid supply tube 23 and of the dosing liquid discharge are fitted in liquid-tight relation in the ends of the tubular valve member 57, as shown. The tubular valve member 57 is clamped between a pair of mating plates or members 58, 59.

The mating faces of the plates 58 and 59 are provided with aligned grooves 60 extending from end to end thereof, in which valving member 57 is nested. The upper plate 58 has at its midpoint a slot 61 to accommodate the valve blade 56. The groove in the bottom support plate 59 is provided with a boss or anvil 62 against which the tubular valve element 57 is pinched by the blade 56, under the force of spring 53. The groove in the plate 59 is widened at the boss 62 so as to permit the valve member 57 to be fully flattened without restraint. The clamping plates 58, 59 are held in registered relation to one another, as well as being made fast to housing 28, by means of the bolt and nut securing members 49, referred to above.

Since the plates 58 and 59 serve not only to clamp but also to support the tubular valve member, it can be made of highly flexible tubing. Thus, a high pressure in the dosing system which would normally distend and burst the tube member 57 does not do so because of the support it receives from the plates 58 and 59. The rounded end 56 of the plunger blade 51 helps prevent the tube 57 from bulging out through the opening 61 in the top clamp plate 58.

Supply tube 23 extends into container 22 (FIG. 1) through a conventional stopper 64, with an air vent member 65 communicating the interior of the container with atmospheric pressure. Dosage tube 20 is provided with a fitting 66 on one end by means of which it is connected to the T-fitting 21 in the pump intake line 13, or at other appropriate dosage point of the system.

This fitting 66 has a spherically rounded discharge extremity 67 which is provided, for example, with a simple elastic check valve 68, the valve having a discharge nose 69 slitted at 70 for a one-way, non-return and relatively friction-free flow of liquid from the dosage tube.

The aligned ends of the tubes 20 and 23 project into the adjacent ends of the valve member 57 and are clamped therein between the plates 58 and 59. It will be apparent that the tubes 20 and 23 and the valve member 57 could be integrally formed as one piece in which case the clamped length of the tube would constitute the valve member.

In operation: When the pressure drops in the water storage tank 16 to the predetermined lower limit, the control switch 18 is closed and both the motor of the pump 11 and the timing motor 29 of the dosage control unit 10 are energized. These motors continue to be energized (e.g. for about 3 minutes) until the upper predetermined pressure is reached in the tank 16, whereupon the switch 18 is opened. The disks 34 and 35 turn when the motor 29 is energized at the rate, for example, of one r.p.m. During each revolution the switch 37 will be closed two times and a typical setting of the notches 36 is such that the switch is closed for one-twentieth of a revolution (i.e. one-twentieth of a minute) if the drive shaft 32 turns at the rate of one r.p.m.

Each time the switch 37 is closed, the solenoid coil 47 is energized and the plunger member 51 is retracted with a snap action so as to fully release the tubular valve member 57. The suction at the intake of the pump 11 will draw treating liquid from the supply container 22 through the conduits 23, 20 and the valve member 57 during the time the latter is opened. At the instant that the solenoid coil 47 is de-energized, the spring 53 closes the valve member 57 with a snap action so as to completely shut off the flow of treating liquid.

Increased or decreased doses of the treating liquid are obtained by setting the gaps 36 to the desired width. It is possible to adjust the dosage control unit 10 so as to accurately discharge doses as small as four drops. The unit can likewise be adjusted to accurately discharge doses many times larger.

Further applications of the dosage control unit 10 in different types of liquid treating systems are illustrated in FIGS. 5 and 6. FIG. 5 shows a booster pump adaptation, in which a booster pump, generally designated 72, is energized through the pressure-actuated switch 18, along with a well pump, such as pump 11 of FIG. 1, whose discharge line is designated 73. The motor of the pump 72 is connected by the conductors 74—74 in parallel circuit relationship with the switch 18 through the conductors 12—12. The control unit 10 is connected in parallel relationship to the switch 18 by conductors 24 as previously described. A float-controlled tank 75 is provided in this installation, into which the dosage tube 20 of unit 10 discharges by gravity when the valve 57 of unit 10 is open. A float 76 controls the intake of water into tank 75 from main pump discharge line 73 through a connecting conduit 77. Treated water is drawn off from an outlet in the bottom of tank 75 through a connecting line 78 to the intake of booster pump 72. The line 78 may have a check valve 89 so as to protect the tank 75 from any excess pressure in line 78. The pump 72 discharges the treated water under increased pressure through a connecting line 79 into the main supply line 73 leading to storage tank 16. In this installation it will be seen that the doses of treating liquid are delivered into a stationary body of water in the tank 75 in response to a flow of water through the line 73.

In the system shown in FIG. 6, a supply of treating liquid is maintained in a closed pressurized container 80. A compressed air line 81, provided with a pressure regulator valve 82 of known type communicates with the interior of container 80 so as to maintain a predetermined pressure therein. When the valve member 57 of the dosage control unit 10 is open, treating liquid is forced through the supply line 23, through the valve and out through the discharge line 20. The adapter 66 on the end of the line 20 is connected to a T-fitting 86 in a liquid supply line 85, such as a water main. The line 85 is provided with flow sensing device 84 having an internal switch which is closed by liquid flow. The internal switch has a stationary member 87 which is closed by liquid flow. The internal switch has a stationary member 87 and a movable member 88 which will swing into contact with the stationary member 87 when liquid is flowing. If there is no flow, the valve member 88 will hang down and the switch will be open. One of the terminals of the device 84 is connected by a conductor 90 to source of current indicated by the conductors 91. The other terminal of the device 84 is connected by a conductor 92 to one of the terminals of the timing motor 29 in the control unit 10. The second terminal of the timing motor is connected by a conductor 93 to the current source 91, as shown. It will be seen that when liquid is flowing in the conduit 85, the flow sensing switch in the device 84 will be closed, thereby energizing the dosage control unit 10. This will operate, as previously described, to periodically discharge doses of treating liquid into the T-fitting 86.

It will be apparent that certain changes may be made in the embodiments of the invention which have been described, and that additional embodiments of the invention may be made without departing from the spirit and scope of the invention. Accordingly, all matter described above or shown in the accompanying drawings is intended to be interpreted as illustrative and not in a limiting sense.

What is claimed as new is:

1. A dosage control unit adapted to accurately control the release of accurate doses of a treating liquid, comprising, a housing, an electric timing motor having a rotor shaft and mounted within said housing, disk means mounted on the rotor shaft of said timing motor having at least one irregularity of predetermined length in the periphery thereof, an electric switch mounted in said housing having an actuating finger engaging the periphery of said disk means whereby said switch is closed during the periods said finger engages said irregularity, a solenoid unit having a movable member and mounted in said housing, a pair of electrical conductors connecting the coil of said solenoid unit in parallel circuit relationship with said timing motor with said switch being connected in series relationship in one of said conductors whereby said solenoid is energized only when said switch is closed, a plunger carried on the movable member of said solenoid unit, a valve member in the form of a length of flexible tubing, support means mounted on said housing for positioning and supporting said valve member, an aperture in said support means through which a portion of one side of said valve member is exposed, said aperture being aligned with the end of said plunger so that the end of the plunger is movable into said opening to engage and pinch off said exposed portion of said valve member against an opposed rigid portion of said support means, and spring means normally holding said plunger in said pinch-off position when said solenoid is de-energized, said solenoid when energized acting to withdraw said plunger from said pinch-off engagement with said valve member.

2. The dosage control unit called for in claim 1 wherein said disk means comprises a pair of disks of the same diameter each of which has at least one irregularity in the periphery thereof, and means for mounting said disks on said timing motor shaft whereby said irregularities can be overlapped to a predetermined degree thereby providing an irregularity of adjustable arcuate length for engaging said actuating finger of said switch.

3. The dosage control unit called for in claim 1 wherein said valve member support means comprises a pair of mating clamping plates each of which has a longitudinally extending groove in the mating face thereof which registers with the groove in the other plate so as to engage around opposite sides of said valve member, means for securing said clamping plates to said housing so that one of said plates fits flatwise against a wall of said housing, an aperture in said housing wall registering with said aperture in the juxtaposed clamping plate which exposes an intermediate portion of said valve member, a limit member fixed to and projecting from the side of said plunger for engaging a fixed portion of said housing so as to limit the outward movement of said plunger but allow the end of the plunger to pinch off said exposed portion of said valve member against the opposed portion of the outer clamping plate, said spring means comprising a compression spring surrounding said plunger on the interior of said housing, said compression spring being compressed between said limit member at one end and a bracket supported on said housing at the other end.

4. The dosage control unit as called for in claim 3 wherein the groove in the outer clamping plate is widened opposite said aperture in said inner clamping plate and provided with a transverse anvil boss which is aligned with the pinching end of said plunger.

5. Automatic chlorinator means in combination with a water system having an electric pump which operates intermittently in order to supply variable demands for water, the intake connection of said pump being connected to a source of supply of water and being under suction when the pump is running, an electric circuit including a pump switch connected to said pump for energizing said pump, said automatic chlorinator means comprising, a container for holding a supply of undiluted chlorinating solution, tubing communicating between said pump intake connection and said container for conducting undiluted chlorinating solution from said container to said intake, at least one length of compressible elastic tubing non-collapsible under suction created by said pump and disposed in said tubing communicating between said container and intake, a solenoid unit having a biased snap-acting valve member operable between open and closed positions and in the closed position completely pinching off said length of compressible elastic tubing and in the open position fully releasing the same into normal shape, an electric timing motor connected in electrical circuit relationship with said electric pump so as to run concurrently with said pump, switch means operatively connected with said timing motor through interrupted camming means so as to be periodically closed thereby during continuous operation of said timing motor and electrical conductor means for interconnecting said solenoid unit in circuit relationship with said switch means whereby said solenoid unit is energized only when said switch is closed.

6. Automatic chlorinator means in combination with a water system having an electric pump which operates intermittently in order to supply variable demands for water, the intake connection of said pump being connected to a source of supply of water and being under suction when the pump is running, an electric circuit including a pump switch connected to said pump for energizing said pump, said automatic chlorinator means comprising, a container for holding a supply of undiluted chlorinating solution, tubing communicating between said pump intake connection and said container for conducting undiluted chlorinating solution from said container to said intake, a solenoid unit having a biased fast-acting valve member operable with said tubing to fully open and fully close the same, an electric timing motor connected in electrical circuit relationship with said electric pump so as to run concurrently with said pump, switch means operatively connected with said timing motor through interrupted camming means so as to be periodically closed thereby during continuous operation of said timing motor, and electrical conductor means for interconnecting said solenoid unit in circuit relationship with said switch means whereby said solenoid unit is energized only when said switch is closed.

7. Automatic chlorinator means in combination with a water system having an electric pump which operates intermittently in order to supply variable demands for water, the intake connection of said pump being connected to a source of supply of water and being under suction when the pump is running, an electric circuit including a pump switch connected to said pump for energizing said pump, said automatic chlorinator means comprising, a container for holding a supply of undiluted chlorinating solution, tubing communicating between said pump intake connection and said container for conducting undiluted chlorinating solution from said container to said intake, said tubing including as a part thereof a length of compressible elastic tubing which is noncollapsible under suction created by said pump and is disposed between said container and intake, a solenoid unit having a biased fast-acting valve member operable with said tubing to fully open and fully close the same, an electric timing motor connected in electrical circuit relationship with said electric pump so as to run concurrently with said pump, switch means operatively connected with said timing motor through interrupted camming means so as to be periodically closed thereby during continuous operation of said timing motor, and a pair of conductors connecting said solenoid unit in parallel circuit relationship with said timing motor, said switch means being connected in series circuit relationship in one of said conductors whereby said solenoid is energized only when said switch means is closed.

References Cited in the file of this patent
UNITED STATES PATENTS

| | | |
|---|---|---|
| 1,610,283 | Hill | Dec. 14, 1926 |
| 1,855,323 | Sirch | Apr. 26, 1932 |

(Other references on following page)

UNITED STATES PATENTS

| | | |
|---|---|---|
| 1,934,791 | Buzler | Nov. 18, 1933 |
| 1,941,766 | Thom | Jan. 2, 1934 |
| 2,006,196 | Crowley | June 25, 1935 |
| 2,012,406 | Savell | Aug. 27, 1935 |
| 2,041,296 | Mason | May 19, 1936 |
| 2,136,776 | Pugatz | Nov. 15, 1938 |
| 2,355,232 | Nelson et al. | Aug. 8, 1944 |
| 2,524,966 | Eisenman | Oct. 10, 1950 |
| 2,615,668 | Ernest | Oct. 28, 1952 |
| 2,610,643 | Goff | Sept. 16, 1952 |
| 2,674,435 | Angell | Apr. 6, 1954 |
| 2,776,009 | Tamburr | Jan. 1, 1957 |
| 2,787,281 | Word | Apr. 2, 1957 |
| 2,811,202 | Schild et al. | Oct. 29, 1957 |